United States Patent

Oguchi et al.

[11] Patent Number: 5,273,812
[45] Date of Patent: Dec. 28, 1993

[54] NON-FOGGING SHEET AND ITS PRODUCTION

[75] Inventors: Kiyoshi Oguchi; Kenji Ueda; Osamu Takekoh; Tomio Doi; Masahiro Yamamoto, all of Tokyo, Japan

[73] Assignee: Dai Nippon Insatsu Kabushiki Kaisha, Tokyo, Japan

[21] Appl. No.: 773,664

[22] PCT Filed: Feb. 27, 1990

[86] PCT No.: PCT/JP90/00239
§ 371 Date: Dec. 24, 1991
§ 102(e) Date: Dec. 24, 1991

[87] PCT Pub. No.: WO91/12963
PCT Pub. Date: Sep. 5, 1991

[51] Int. Cl.[5] .................................. B32B 9/00
[52] U.S. Cl. ........................ 428/220; 428/409; 428/411.1; 156/273.7; 156/247
[58] Field of Search .............. 427/44, 54.1, 155, 365, 427/366, 428; 156/273.7, 275.5, 324, 247, 327, 344; 428/409, 411.1, 336, 220, 913, 40

[56] References Cited

U.S. PATENT DOCUMENTS

| | | | |
|---|---|---|---|
| 4,470,858 | 9/1984 | McMaster | 156/103 |
| 4,605,574 | 8/1986 | Yonehara | 427/424 |
| 5,037,668 | 8/1991 | Nagy | 427/44 |

OTHER PUBLICATIONS

R. Takiguchi et al., "Anti-Fogging Sheet", Patent Abstracts of Japan, JP-A-63 278 840 Nov. 16, 1988.
Takiguchi, Chemical Abstracts, vol. 110, No. 22, 194270w May 29, 1989.

Primary Examiner—Patrick J. Ryan
Assistant Examiner—Patrick R. Jewik
Attorney, Agent, or Firm—Wegner, Cantor, Mueller & Player

[57] ABSTRACT

A method for producing a thick film type of non-fogging sheets having a thickness of 30 μm or more comprises the steps of: preparing a solvent-free composition comprising (a) a polymer, (b) a hydrophilic monomer and (c) a surface active agent and having a viscosity of 50,000 cP or less, applying this composition as a coating on the surface of a backing film without recourse to any solvent, and crosslinking the thus coated composition by exposure thereof to ionizing radiation, thereby forming a hydrophilic film having a thickness of 30 μm or more.

10 Claims, 1 Drawing Sheet

NON-FOGGING SHEET AND ITS PRODUCTION

TECHNICAL FIELD

The present invention relates to a non-fogging sheet and its production. More particularly, it concerns a non-fogging sheet whose surface is in good condition and which has excellent durability in retaining fogging-preventive property over an extended period of time and its production.

BACKGROUND ART

When automotive windows and side mirrors, bathroom mirrors and windows, etc. are exposed to moisture, their surfaces become cloud and so require frequent wiping, which is inconvenient. Accordingly, various measures are being taken to impart non-fogging property to the surfaces of such articles.

Heretofore, non-fogging layers designed to impart non-fogging to the surfaces of articles have typically included:

(i) layers caused to exhibit fogging-preventiveness by incorporating surface active agents in resins by kneading, (ii) layers to which such inorganic salts as colloidal silica and phosphites are added to extend their non-fogging life, and (iii) layers whose surfaces are made hydrophilic by modification of polymers such as saponification of acetyl cellulose.

However, a problem with the layers (i) and (ii) is that their non-fogging life is short due to the exudation of the surfactants, and the layers (iii) have low film strength during wetting so that when laid out, there are apt to be damaged and become degraded in terms of non-fogging.

In order to solve the above described problems of the prior art, we have already proposed a non-fogging sheet including a backing film and a non-fogging layer, characterized in that the non-fogging layer is obtained by exposure of a polymer and a hydrophilic monomer to electron beams for their crosslinking (e.g., Japanese Patent Laid-Open (Kokai) Publication Nos. 63-273668, 63-251401, 63-258905, 63-258904 and 63-278840).

Incidentally, non-fogging sheets including relatively thick, non-fogging layers (hydrophilic films) have recently been in great demand due to requirement for non-fogging to be much more improved and retained over a much longer period of time. However, it has now been found that when it is intended to form thicker non-fogging layers with a solvent-containing coating solution, not only do solvent residues pose another problem, but the resulting non-fogging layers suffer surface roughening as well, thus making them unsuitable for non-fogging sheets to be applied over mirrors or windowpanes.

DISCLOSURE OF THE INVENTION

Therefore, it is an object of this invention to provide a non-fogging sheet including a thick hydrophilic film so as to retain non-fogging property over a long period and a method for producing the same.

With the above-mentioned object in mind, we have made study after study and have found as a result that it is possible to obtain a thick hydrophilic film whose surface is in good condition by applying on a backing or support film a hydrophilic film-forming composition comprising specific components and having a specific viscosity, in the form of a non-solvent type of coating solution, by means of a specific process and crosslinking it by exposure to ionizing radiation.

More particularly, the present invention provides a method for producing a thick film type of non-fogging sheet of 30 μm or more in thickness, characterized by comprising the steps of:

preparing a solvent-free composition comprising (a) a polymer, (b) a hydrophilic monomer, and (c) a surface active agent and having a viscosity of 50,000 cP, applying said composition on a backing film without recourse to any solvent, and crosslinking the thus coated composition by exposure to ionizing radiations, thereby forming a hydrophilic film of 30 μm or more in thickness.

In a preferable mode of carrying out this invention, in carrying out the coating of the backing film with the above described composition and the forming of the hydrophilic film:

the backing film and the laminating film are prepared;

both films are placed one upon the other between a pair of rolls;

the above-mentioned composition is fed and carried under pressure in between the two films, thereby forming a layer of said composition between the films while forcing out a surplus amount of the composition fed with the force with which both the films are pressed together between said rolls to create a composition plenum on the boundary of the two films at a roll nip entrance, thereby preventing gases from being entrained in the composition layer formed between the two films;

the obtained laminate composed of a backing film-/composition/laminating film combination is exposed to ionizing radiations to crosslink the composition in said laminate, thereby forming a hydrophilic film having a thickness of 30 μm or more; and said laminating film is released from said laminate, leaving said hydrophilic film on said backing film.

BEST MODE FOR CARRYING OUT THE INVENTION

Figure 1:
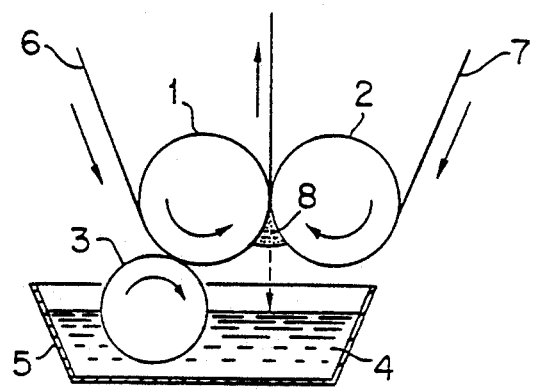
FIGS. 1 to 3 are schematic views indicating the lamination method which can be used in the production of the non-fogging sheet of this invention.

The present invention will now be described in greater detail.

For the support film, various materials can be used depending upon the intended purpose, if they have mechanical strength sufficient to support the hydrophilic film and show transparency. Illustratively but not exclusively, use can be made of films of synthetic resins, e.g., polyesters such as polyethylene terephthalate, polyolefins such as polyethylene and polypropylene, polyamides such as nylon, polycarbonates, polyacrylates, polystyrenes and polyvinyl chlorides. These films may be laminated together for use.

If required, the support film may be colored in various colors. Preferably, the colorants used are such disperse dyes as monoazo, bisazo, anthraquinone, nitro, styryl, methine, aroylene, benzimidazole, aminonaphtylamide, naphthoquinoneimide and coumarin derivative dyes.

Basically, the hydrophilic film according to this invention comprises a crosslinked product of a composition containing a polymer with a hydrophilic monomer plus a surface active agent. Specifically but not exclusively, the composition is composed of:

(a) polymer plus hydrophilic monomer plus surfactant, (b) polymer plus hydrophilic monomer plus crosslinkable monomer plus surfactant, (c) polymer plus hydrophilic crosslinkable monomer plus surfactant, and (d) polymer plus hydrophilic monomer plus hydrophilic crosslinkable monomer plus surfactant. In all the above-mentioned combinations, either functional or non-functional types of polymers may be used.

The non-functional type of polymers used, for instance, may include alkyl polyacrylates, alkyl polymethacrylates, polyurethane, polyester, polyamide, polyvinyl acetate, polyvinyl chloride, polystyrene, polyacrylonitrile and polyvinyl pyrrolidone.

A hydrophilic group may have been previously incorporated in the non-functional type of polymer so as to make it highly compatible with the hydrophilic monomer. To this end, use may be made of a copolymer with the hydrophilic group-containing monomer (hydrophilic monomer) to be described later. The proportion of the hydrophilic monomer to the non-functional type of polymer is at most 50 mol %. At a proportion higher than 50 mol %, the water resistance of the resulting film decreases.

Use may also be made of polyvinyl alcohol derivatives such as partially saponified polyvinyl alcohol, polyvinyl butyral and polyvinyl acetal, and cellulose derivatives such as nitrocellulose, cellulose acetate, cellulose acetate butyrate, cellulose acetate propionate and hydroxypropylcellulose.

The functional polymers, on the other hand, contain a functional group crosslinked by exposure to ionizing radiation, examples of which are given below.

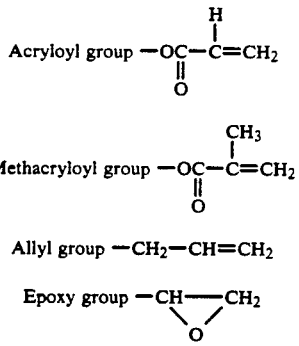

Preferably, the number of the functional groups is one per molecular weight of 300 to 10,000. At less than one per 10,000 they have no or little crosslinking effect, while at more than one per 300 the crosslinking density becomes too high.

As the functional polymers, use may be made of urethane acrylates, polyester acrylates, epoxy acrylates and so on; copolymers having acryloyl groups introduced in them such as those of alkyl acrylates with 2-hydroxyethyl acrylate in which a 1:1 adduct of acrylic acid chloride or 2-hydroxyethyl acrylate with diisocyanato are added to the hydroxyl groups; copolymers of alkyl acrylates with acrylic acid, having glycidyl methacrylates added to the carboxyl groups; polyvinyl butyral polymers having a 1:1 adduct of acrylic acid chloride or 2-hydroxyethyl acrylate with diisocyanato added to the residual hydroxyl groups, and so on.

It is understood that although the above-mentioned polymers may be oligomeric, they should preferably have a weight-average molecular weight of 1,000 to 300,000 in consideration of film-forming abilities.

The hydrophilic monomers contain such hydrophilic groups as hydroxyl, carboxyl (metal salt), amide, imide, sulfone, ammonium salt and phosphoric acid groups. By way of example alone, mention is made of 2-hydroxyethyl acrylate or methacrylate, 2-hydroxypropyl acrylate or methacrylate, acrylic acid, methacrylic acid, metal salts of acrylic or methacrylic acid, dimers of acrylic acid, acrylamide, methacrylamide, dimethylaminopropylacrylamide, dimethylaminopropylmethacrylamide, N-acryloylmorpholine, N-methacryloylmorpholine, N-methylolacrylamide, N-methylolmethacrylamide, t-butylacrylamide, t-butylmethacrylamide, N-methoxylmethyl-acrylamide, N-ethoxylmethylacrylamide, N-n-butoxyacrylamide, N,N-dimethylacrylamide, N,N-dimethylaminopropylacrylamide, N,N-dimethylaminopropylmethacrylamide, polyethylene glycol monomethacrylate, polypropylene glycol monomethacrylate, glycerol monomethacrylate, 2-acrylamide-2-methylpropane-sulfonic acid, methacrylamidepropyltrimethylammonium chloride, methacryloyloxyethyltrimethylammonium chloride and mono(2-methacryloyloxyethyl)acid phosphate.

Containing two or more groups which provide easily radicals by exposure to ionizing radiation, such as acryloyl, methacryloyl, allyl and epoxy groups, the crosslinkable monomers are crosslinked to both the skeletal polymers and hydrophilic monomers to improve the overall crosslinking density of the film, thereby increasing the strength of the film, and serve to remove any trace of the unreacted hydrophilic monomers.

Such crosslinkable monomers may include difunctional monomers, e.g., ethylene glycol dimethacrylate, diethylene glycol dimethacrylate, 1,6-hexanediol dimethacrylate, glycidyl methacrylate, neopentyl glycol dimethacrylate, tetraethylene glycol dimethacrylate, 2,2-bis[4-(acryloxydiethoxy)phenyl]propane, 2,2-bis[4-(methacryloxydiethoxy)phenyl]propane, 2,2-bis[4-(acryloxy-polyethoxy)phenyl]propane and 2,2-bis[4-(methacryloxy-polyethoxy)phenyl]propane; trifunctional monomers, e.g. trimethylolpropane trimethacrylate; and other polyfunctional monomers, e.g., tetramethylolmethane tetraacrylate and pentaerythritol hexaacrylate.

The hydrophilic crosslinkable monomers contain such hydrophilic groups as hydroxyl, carboxyl (metal salt), amide, imide, sulfonic acid (metal salt), ammonium salt and phosphoric acid groups and two or more crosslinkable functional groups which provide easily radicals by exposure of ionizing radiation, e.g., acryloyl, methacryloyl, allyl and epoxy groups.

Such hydrophilic crosslinkable monomers, for instance, may include those containing hydroxyl groups, e.g., glycerol di(meth)acrylate and glycerol methacrylate acrylate; 1:2 adducts of diol/diglycidyl ethers ethylene glycol, diglycidyl ether di(meth)acrylate, polyethylene glycol/diglycidyl ether di(meth)acrylate, polypropylene glycol/diglycidyl ether di(meth)acrylate, neopentyl glycol/diglycidyl ether di(meth)acrylate, glycerin diglycidyl ether di(meth)acrylate, bisphenol A diglycidyl ether di(meth)acrylate and trimethylolpropane triglydcidyl ether di(meth)acrylate with acrylic acid; pentaerythritol derivatives, e.g. pentaerythritol mono(meth)acrylate, pentaerythritol di(meth)acrylate, pentaerythritol tri(meth)acrylate, dipentaerythritol mono(meth)acrylate, dipentaerythritol di(meth)acrylate, dipentaerythritol tri(meth)acrylate, dipentaerythritol tetra(meth)acrylate and dipentaerythritol penta(meth)acrylate; and acrylamide derivatives, e.g., methylenebis(meth)acrylamide, an adduct of acrylamide with glyoxal, a condensate of acrylamide with methylol ethylene urea, 1,3,5-triacryloylhexahydro-s-triazine, N,N-diallylacrylamide, acrylamide, a methylol/melamine condensate, an acrylamide/methylol triazone condensate, an acrylamide/methylol hydrantoin condensate; acrylamide/methylol urea and N,N-diallylacrylamide.

The hydrophilic film used in this invention also contains a surface active agent, which serves to bleed slowly through the hydrophilic film, thereby imparting non-fogging property (the capability of preventing dew condensation) to the sheet. In addition, the surfactant serves to keep the hydrophilic monomer in the film in good condition. All surfactants, whether anionic, nonionic or cationic, may be used, if they are highly compatible with the composition comprising the above mentioned components to form the hydrophilic layer.

By way of example alone, the anionic surfactants may include fatty acid salts, alkyl sulfates, alkyl benzenesulfonates, alkyl naphthalenesulfonates, dialkyl sulfosuccinates, alkyl phosphates, naphthalenesulfonic acid/formalin condensates and polyoxyethylene alkyl sulfates; the nonionic surfactants polyoxyethylene alkyl ethers, polyoxyethylene alkyl phenol ethers, polyoxyethylene fatty acid esters, sorbitan fatty acid esters, polyoxyethylene sorbitan fatty acid esters, polyoxyethylene alkylamines, glycerin fatty acid esters and polyoxyethylene/hydroxypropylene block copolymers; and the cationic surfactants alkylamines and quaternary ammonium salts.

In forming the hydrophilic film used in this invention, 5 to 400 parts of the hydrophilic monomer should preferably be added to 100 parts of the polymer. At below 5 parts by weight, sufficient hydrophilic nature is not imparted to the film, whereas at higher than 400 parts by weight the film deteriorates in terms of water resistance. More preferably, the content of the hydrophilic monomer lies in the range of 50 to 300 parts by weight.

The crosslinkable monomer is used in an amount of 1 to 300 parts by weight per 100 parts by weight of the polymer. At below 1 part by weight, the crosslinking of the unreacted hydrophilic monomer becomes insufficient, whereas at a quantity exceeding 300 parts by weight, the overall crosslinking density of the film becomes too high. Especially when the polymer is functional group-free, the content of the crosslinkable monomer should lie in the range of, preferably 5 to 300 parts by weight, more preferably 5 to 200 parts by weight. When the polymer contains a functional group, on the other hand, the content of the crosslinkable monomer should lie in the range of, preferably 1 to 200 parts by weight, more preferably 5 to 200 parts by weight.

The hydrophilic crosslinkable monomer is used in an amount of 1 to 200 parts by weight per 100 parts by weight of the polymer. At below 1 part by weight, neither sufficient hydrophilic nature nor crosslinkability is imparted to the film, whereas at a quantity exceeding 200 parts by weight, the crosslinking density of the film becomes too high. Thus a preferable content of the hydrophilic crosslinkable monomer ranges from 1 part by weight to 100 parts by weight.

Preferably, the surfactant should be used in an amount of not greater than 200 parts by weight per 100 parts by weight of the polymer. At greater than 200 parts by weight, the crosslinking of the film becomes insufficient with an increase in the amount of exudation of the surfactant. More preferably, the surfactant should be used in an amount of 1 to 100 parts by weight. When the composition is cured by exposure to ultraviolet rays, use may be made of sensitizers capable of evolving radicals by exposure to ultraviolet rays such as benzoquinone; benzoin; benzoin ethers, e.g., benzoin methyl ether; halogenated acetophenones; and biacetyls.

In forming the hydrophilic film, it is important that the composition comprising a suitable combination of the above-mentioned components be formed into a coating solution without recourse to any solvent. We have found that the hydrophilic film, if it is 30 μm or less in thickness, can be kept in good surface condition even with a solvent-containing coating solution, but if it has a thickness greater than 30 μm, then its surface condition becomes drastically worse. Using solvent-free coating solutions would not only make the production process simple but would be advantageous in connection with safety and environmental problems as well.

With the above mentioned composition, the hydrophilic film can be formed on the backing film in the following manner.

The solventless composition is first adjusted to a suitable viscosity by an appropriate method such as heating and then roll coated on the backing film by gravure reverse, three-roll reverse, gravure direct, four-roll reverse or other technique.

For instance, when the composition is to be mirror-finished after being applied on the backing film, a mirror-like film is laminated on the coated composition, which step is then followed by exposure to ionizing radiation.

The manner in which the hydrophilic film is formed by the above mentioned lamination will now be described.

For efficient production of thick-type non-fogging sheets such as those contemplated in this invention, laminating techniques are superior. According to a typical laminating technique:

a backing film and a laminating film are provided;

both films, one superimposed upon the other, are placed between a pair of rolls;

the above mentioned composition is fed and carried under pressure in between the two films, thereby forming a layer of said composition between the films while forcing out a surplus amount of the composition fed with the force with which both the films are pressed together between said rolls to create a composition plenum at the interface between the films at a roll nip entrance, thereby preventing gases from being entrained in the composition layer formed between the two films;

the obtained laminate composed of a backing film/composition/laminating film combination is exposed to ionizing radiation to crosslink said composition in the laminate, thereby forming a hydrophilic film having a thickness of 30 μm or more; and said laminating film is released from said laminate, leaving said hydrophilic film on said backing film.

In order to laminate films together, at least one film is ordinarily pre-coated with a composition in the amount required for lamination and is then pressed upon the other between nip rolls.

A problem with this laminating technique, however, is that when the applied coating solution is in an uneven surface condition or when the coating solution is thickly applied, air bubbles are apt to be entrained in the coat layer.

Entrainment of air in the coat layer not only prevents it from functioning well but also causes appearance defects such as blistering. Air also acts as a reaction inhibitor when the coat layer is cured after lamination, giving rise to such problems as insufficient curing of the coat layer (or hydrophilic film).

We have now found that when a pair of films are pressed together with a coating solution comprising a hydrophilic film-forming composition interposed therebetween in an amount greater than the quantity needed for obtaining the desired film thickness, the entrainment of air bubbles, etc. can be effectively prevented by forcing out a surplus amount of the ink with the resulting force, thereby creating a coating solution plenum.

FIG. 1 is a schematic view illustrating the above mentioned laminating technique.

The arrangement shown in FIG. 1 includes a pair of nip rolls 1 and 2, a coating roll 3 and a coating reservoir 5 in which a coating solution 4 is stored.

According to such an arrangement, one film, for instance, a backing film 6 is fed in between the nip rolls 1 and 2 after being passed through between the nip roll 1 and the coating roll 3. Since the coating roll 3 has been coated thereon with the coating solution 4 stored in the reservoir 5, the backing film 6 is designed to reach the roll nip entrance between the nip rolls 1 and 2 after it has been coated with the coating solution 4.

The roll nip between the coating roll 3 and the nip roll 1 is so controlled that the amount of the coating solution 4 to be coated on the backing film 6 by the coating roll 3 is greater than the quantity needed for lamination.

A laminating film 7, on the other hand, is supplied to the roll nip entrance around and from the nip roll 2.

Upon reaching the roll nip entrance, the backing film 6 and laminating film 7 are pressed and laminated together between the nip rolls 1 and 2. In this case, a surplus amount of the solution is forced toward the roll nip entrance by the resulting force to create a coating solution plenum 8 there, because the backing film 7 is coated with the coating solution in an amount greater than the quantity needed for obtaining the desired film thickness.

This plenum 8 ensures that the surfaces of contact of the film 6 and 7 are completely covered with the coating solution during lamination. Therefore the two films can be laminated together without their laminating surfaces coming in contact with air, thereby effectively preventing the entrainment of air in the coat layer.

In the above described arrangement, the plenum 8 is located below the roll nip. Thus, when the coating solution forming the plenum 8 reaches a certain amount, it trickles down, as shown by an arrow in FIG. 1, and is received by the reservoir 5. Such recycling of the ink offers an economical advantage.

Adjustment of the amount of the composition to be coated can be achieved by regulating the roll nip between the nip rolls 1 and 2 in such a way that a desired thickness of the hydrophilic film is attainable depending upon the thicknesses of the backing and laminating films 6 and 7 and the ink used.

After the backing and laminating films 6 and 7 have been thus laminated together, the laminate is treated with a drier or curing means such as ultraviolet rays or electron beams to cure the coating solution. Finally, only the laminating film is removed from the laminate to obtain a non-fogging sheet.

The laminating film 7 usable with the above described laminating technique may be formed of any of various materials provided that they have mechanical strength sufficient to support the hydrophilic layer. Specifically but not exclusively, use may be made of films or sheets of such synthetic resins as polyesters, e.g., polyethylene terephthalate; polyolefins, e.g., polyethylene and polypropylene; polyamides, e.g., nylon, polycarbonates; polyacrylates; polystyrenes; and polyvinyl chlorides as well as synthetic or conventional paper.

In order to cure the coating solution by exposure to ultraviolet rays, it is preferable to use a transparent film through which ultraviolet rays transmit well.

However, our finding teaches that to prepare the backing and laminating films from the same material is more effective for maintaining non-fogging properties over an extended period of time. This is believed to be due to the fact that both films, if made from the same material, exhibit surface energy properties that are mutually identical, whereby the surfactant in the hydrophilic film interposed between them will be dispersed and held uniformly and isotropically. In other words, the surface active agent in the hydrophilic film serves to pick up the hydrophilic monomer and retain it in place. In this case, however, if the two films have different surface energy properties, then the hydrophilic monomer will be passed onto the surface of either one thereof. Our finding shows that such shifting (anisotropy state) of the hydrophilic monomer is undesirable for exhibiting of non-fogging property and its long-term maintenance.

Another important factor in the forming of the hydrophilic film by the above described laminating technique is the viscosity of the composition to be coated. For this technique, the coating solution should have a viscosity of 50,000 cP or less. More preferably, the viscosity of the coating solution is 5,000 cP or less. At a viscosity higher than 50,000 cP, the feeding of the coating solution is so poor during lamination that air can be readily entrained in the coat layer.

In addition, it is necessary in the practice of this invention that the obtained hydrophilic film have a surface roughness of 0.1 $\mu$m or less, preferably 0.05 $\mu$m or less, more preferably 0.01 $\mu$m, as expressed in terms of centerline-average roughness.

In order to obtain a film having such a roughness, it is desirable to use films having a centerline-average roughness of 0.1 $\mu$m or less, preferably 0.05 $\mu$m or less, as the backing and laminating films.

While a specific laminating technique has been described with reference to FIG. 1, it is to be understood that the present invention is not limited thereto, various modifications being possible.

Figure 2:
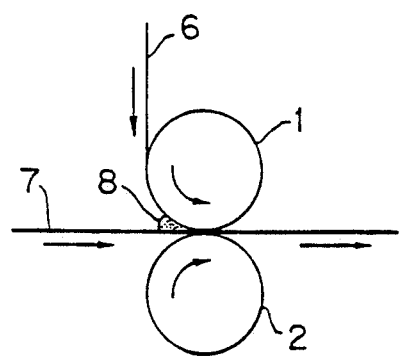

For instance, the backing sheet 6 (which has been coated with the coating solution) may be fed toward the nip rolls 1 and 2 with transverse feeding of the laminating film 7. By way of example alone, the backing film 6 may be fed from above with transverse feed of the laminating film 7, as shown in FIG. 2. In this case, the plenum 8 is created on one side of the roll nip and above the film. The backing and laminating sheets 6 and 7 may also be reversed in position.

Figure 3:
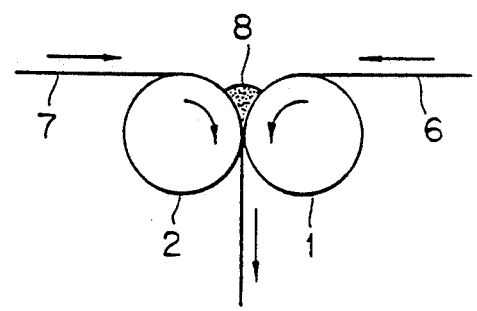

As illustrated in FIG. 3, both the backing sheet 6 (which has been coated with the coating solution) and the laminating film 7 may be fed respectively between the nip rolls 1 and 2 from above and then guided downwardly. In this case, the plenum 8 is formed above the roll nip.

A method of curing the hydrophilic layer in the thus obtained laminate will now be described.

As already mentioned, this hydrophilic layer can be cured by exposure to such ionizing radiation as an electron beam and ultraviolet rays.

For electron beam irradiation, use may be made of any desired technique, e.g., an electron curtain or beam scanning technique. The electron beam to be used has an energy of about 150 to 200 keV, with the dose varying dependent upon the composition of the coating solution, the desired crosslinking density and other factors. The more the number of the functional groups in the polymer, the less the dose will be. The higher the crosslinking density, on the other hand, the more will the required dose be. Especially when a surfactant has been used, its exudation becomes insufficient at higher crosslinking densities with a drop of non-fogging property (the capability of preventing dew condensation). Thus dose control is of importance.

With the foregoing in mind, the dose is generally limited to the range of 0.5 to 20 Mrad. At less than 0.5 Mrad the unreacted monomer tends to remain, whereas at higher than 20 Mrad the crosslinking density becomes too high.

For ultraviolet ray irradiation, use may be made of ultraviolet rays emanating from such light sources as very high pressure mercury lamps, high pressure mercury lamps, low pressure mercury lamps, carbon arcs, xenon lamps, metal halide lamps and black light lamps. After the hydrophilic film has been formed by the irradiation with electron beams or ultraviolet rays, a mirror-finish film or the like, if any, may then be removed from the laminate. Surface films may also be used as protective films until the sheets are to be laid out.

By the practice of this invention wherein hydrophilic films are formed with a non-solvent type of coating solution, it is thus possible to keep non-fogging sheets in good surface condition even when such films have a thickness of 30 $\mu$m or more. In addition, the surfaces of non-fogging sheets can be mirror-finished or otherwise processed by exposing them with surface films attached thereon to an electron beam or ultraviolet rays.

Specifically but not restrictively, the present invention will now be described in greater detail with respect to some examples.

EXAMPLE 1

A two-liter separable flask equipped with a heater and a stirrer was used together with a separable cover. Placed in the flask was 444 g of isophorone diisocyanate together with 0.2 g of a catalyst di-n-butyltin dilaurate, which were then heated and stirred at 40° C. Then, 650 g of butylene adipate (Nipporan N-4570) was added to the system at such a slow rate as to suppress a drastic increase in the interior temperature of the system, thereby allowing the reaction to proceed. Two hour later, 232 g of 2-hydroxyethyl acrylate was added dropwise to the system while bringing the reaction temperature up to 60 ° C., and stirring was continued until IR spectral peaks showing the presence of isocyanate groups at 2330 cm$^{-1}$ disappeared. In this way, urethane acrylate (I) was obtained in a nearly 100% yield.

One hundred (100) parts by weight of a hydrophilic monomer 2-hydroxyethyl methacrylate, 10 parts by weight of a crosslinker neopentyl glycol diacrylate (NPGDA for short) and 5 parts by weight of a surfactant Emulgen (?) 106 (made by Kao Soap Co., Ltd.) were uniformly mixed with 100 parts by weight of the obtained urethane acrylate (I) to prepare a coating solution. This solution was adjusted to a viscosity of 500 cP by heating, and then roll coated on an easily bondable, 50 $\mu$m thick polyester film (HP-7 made by Teijin Limited) to a thickness of 50 $\mu$m. On the polyester film was then laminated a 25-$\mu$m thick polyester film (Lumilar T type) by the above described technique. The laminate was exposed to a 175-keV electron beam in a dose of 5 Mrad through an electron curtain type electron beam irradiator (made by BSI Co., Ltd.) to cure the coat. The thus obtained film was found to have a centerline-average surface roughness of 0.005 $\mu$m.

By the following tests, the obtained non-fogging sheet was evaluated in terms of non-fogging property.

(1) Air-Fogging Test (for determining whether or not air fogging occurred)
O: No fogging occurred.
X: Fogging occurred.

(2) 50° C.-Vapor Test (for determining whether or not fogging took place by exposure to vapor of 50° C.)
⊙: No fogging took place over as long as 1 hr. or more.
O: No fogging took place for 3 min. or longer.
Δ: Fogging took place within 3 min.
X: Fogging took place immediately.

The non-fogging sheet obtained in this example was found to be O for (1) and ⊙ for (2).

EXAMPLE 2

The procedure of Example 1 was followed with the exception that 1,000 g of carbonate diol (Pracsel CD-210 made by Daicel Chemical Industries Ltd.) was used in place of butylene adipate, thereby synthesizing urethane acrylate (II).

One hundred (100) parts by weight of a hydrophilic monomer glycerol monomethacrylate (GM for short) and 10 parts by weight of a surfactant Resistat SA-130 (made by Daiichi Kogyo Yakuhin K.K., Japan) were uniformly mixed with 100 parts by weight of the obtained urethane acrylate (II). The mixture was then coated in a similar manner as described in Example 1, thereby obtaining a 40 $\mu$m thick, electron beam-cured film.

The thus obtained non-fogging sheet was estimated to be O for (1) and ⊙ for (2).

EXAMPLE 3

A coating solution consisting of 100 parts by weight of an acrylic polymer, 200 parts by weight of a hydrophilic monomer GM, 20 parts by weight of a crosslinking agent pentaerythritol acrylate (PETA for short) and 5 parts by weight of a surfactant Exicel 0–95R (made by Kao Soap Co., Ltd., Japan) was prepared.

This coating solution was prepared according to the following procedure. 70 parts by weight of methyl methacrylate, 39 parts by weight of 2-hydroxyethyl methacrylate, 0.15 parts by weight of azobisisobutyronitrile and 70 parts by weight of methyl ethyl ketone were placed in a nitrogen-substituted separable flask equipped with a reflux pipe and a stirrer for a five-hour reaction at 85° C. in an N$_2$ stream. Subsequently, an additional 0.15 parts by weight of azobisisobutyronitrile was added for a three-hour reaction. After the reaction, 218 parts by weight of GM, 21.8 parts by weight of PETA and 5.45 parts by weight of 0-95R were added. Then heating and stirring were carried out to remove methyl ethyl ketone, thereby obtaining the desired coating solution.

This coating solution was adjusted to a viscosity of 1,000 cP by heating, roll coated on a 50-μm thick, easily bondable polyethylene terephthalate film (HP-7 made by Teijin Limited, Japan), and dried at 100° C. The film was laminated according to the procedure of Example 1, and then exposed to an electron beam to cure the coat at a thickness of 50 μm.

The thus obtained non-fogging sheet was evaluated to ○ be for (1) and ⊙ for (2).

EXAMPLE 4 to 11

With the compositions shown in Table 1, the procedure of Example 1 was followed to obtain non-fogging sheets, which were then similarly tested. The results are shown in Table 1.

EXAMPLE 12 to 15

A blend obtained by adding 5 parts by weight of a photoinitiator (Irgacure 651) to 100 parts by weight of each of the coating solutions used in Examples 1 to 4 was exposed for 5 seconds to ultraviolet rays (160 w/cm input) from a high pressure mercury lamp in place of an electron beam.

50° C. vapor. At this thickness fogging took place within about 50 hours. At such a film thickness as referred to in Example 7, on the other hand, no fogging occurred after the elapse of as long as 100 hours.

With the present non-fogging sheet having a hydrophilic film of increased thickness, it is possible to increase the absolute amount of moisture intake and hence improve the non-fogging performance. The addition of a surface active agent as a long-term non-fogging additive offers and advantage in view of non-fogging retention. In other words, since thick films are larger than thin films in terms of the absolute content of a surface active agent, the thick films can retain non-fogging property over a much longer period of time, when the thick and thin films are equivalent to each other in terms of bleeding control by exposure to an electron beam.

INDUSTRIAL APPLICABILITY

The non-fogging sheets according to this invention can be used for the following applications.

1) Spectacle Lenses: spectacles of various degrees, sunglasses, dustproof and prevention-of-disasters goggles, and swimming and diving goggles, etc.
2) Masks: smoke masks, agricultural masks, diving masks, other safety masks, protectors, helmet shields, etc.
3) Mirrors: room mirrors, bathroom mirrors, road mirrors, medical (dental) mirrors, automotive mirrors, hand mirrors, etc.

TABLE 1

| Ex. Nos. | Composition of hydrophilic film | | | | Coat thickness (μm) | Results of non-fogging tests | | Coat strength Stage test |
|---|---|---|---|---|---|---|---|---|
| | Polymers (p.b.w) | Hydrophilic monomer (p.b.w.) | Crosslinkable monomer (p.b.w) | Surfactants (p.b.w) | | (1) Air test | (2) 40° C. vapor | |
| 4 | Urethane acrylate(I) 100 | GMMA[1] 100 | DEGMA[2] 100 | Nonion SP-60r[3] 50 | 30 | ○ | ○ | ⊙ |
| 5 | Urethane acrylate(I) 100 | AM[4] 500 | DEGMA 300 | Emulgen 108[5] 200 | 40 | ○ | ⊙ | ⊙ |
| 6 | Urethane acrylate(I) 100 | AA[6] 200 | DPEPA[7] 30 | Emulgen 104[5](10) Emulgen 408[5](10) | 35 | ○ | ○ | ⊙ |
| 7 | Urethane acrylate(I) 100 | AD[8] 100 | DPAHA[9] 10 | Emulgen 108 10 | 50 | ○ | ⊙ | ⊙ |
| 8 | Urethane acrylate(I) 100 | AD 100 | DPAHA 10 | Registat 212[10] 5 | 50 | ○ | ○ | ⊙ |
| 9 | Urethane acrylate(I) 100 | HEMA[11] 150 | DPEPA(10) DPEHA(10) | Emulgen 106[5] 20 | 45 | ○ | ⊙ | ⊙ |
| 10 | PEG 100 | AD 200 | PETA[12] 30 | Emanol 4110[5] 10 | 30 | ○ | ○ | ○ |
| 11 | M-6400[13] 100 | GMMA 100 | DPEPA 50 | Reodol TW-0106[5] 20 | 35 | ○ | ○ | ○ |

Note:
[1] Glycidyl monomethacrylate
[2] Diethylene glycol monomethacrylate
[3] Made by Nippon Yushi K.K., Japan
[4] N-acryloylmorpholine
[5] Made by Kao Soap Co., Ltd., Japan
[6] N,N-dimethylacrylamide
[7] Dipentaerythritol acrylate
[8] Acrylic acid dimer
[9] Dipentaerythritol hexaacrylate
[10] Made by Daiichi Kogyo Seiyaku K.K., Japan
[11] Hydroxyethyl methacrylate
[12] Pentaerythritol tetraacrylate
[13] Polyester acrylate made by Toa Gosei K.K., Japan

COMPARATIVE EXAMPLE 1

The composition of Example 8 was coated to a thickness of 3 μm to evaluate its non-fogging property which was lower than that obtained in Example 8, as expressed by ○ for (1) and Δ for (2).

COMPARATIVE EXAMPLE 2

The composition of Example 7 was coated to a thickness of 5 μm to evaluate its performance by exposure to 4) Instrument Boards: various detectors/sensors, measuring instruments, etc.
5) Glass Articles: architectural window glass, window glass for vehicles, electronic range glass, front glass for watch towers, refrigerator/freezer showcases, etc.
6) Plastic Articles: agricultural houses and polymers, greenhouses, light windows, food package films, etc.

7) Defrosting systems for the interior of electrical appliances defrosting systems for refrigerators, other household electric appliances, etc.

What is claimed is:

1. A method for producing a non-fogging sheets having a thickness of 30 μm or more, comprising the steps of:

preparing a solvent-free composition comprising, as essential components, (a) a polymer, (b) a hydrophilic monomer and (c) a surface active agent and having a viscosity of up to 50,000 cP, the proportion of said hydrophilic monomer to said polymer being at most 50 mole percent, the weight ratio of said hydrophilic monomer to said polymer being 5–400:100, the weight ratio of said surface active agent to said polymer being <200:100, said polymer comprising a functional polymer, the number of functional groups being one per molecular weight of 300 to 10,000.

placing a baking film and a laminating film having a centerline-average surface roughness of 0.1 μm or less, one superimposed upon the other, between a pair of rolls, feeding and introducing said solvent-free composition under pressure in between said two films, thereby forming a layer of said composition between said films while forcing out a surplus amount of the composition fed with the force with which both the films are pressed together between said rolls to create a composition plenum on the interface of said two films at a roll nip entrance, thereby preventing gases from being entrained in the composition layer formed between the said two films, exposing the obtained laminate composed of said backing film/composition/laminating film combination to ionizing radiation to crosslink the composition in said laminate, thereby forming a hydrophilic film having a thickness of not less than 30 μm, and removing said laminating film from said laminate, leaving said hydrophilic film on said backing film.

2. A method as claimed in claim 1, wherein said composition further contains a crosslinkable monomer.

3. A method as claimed in claim 1, wherein said composition comprises a crosslinkable monomer.

4. A method as claimed in claim 1, wherein said ionizing radiation is by an electron beam or ultraviolet rays.

5. A non-fogging sheet obtained by the method as claimed in claim 1.

6. A non-fogging sheet as claimed in claim 5, characterized in that said centerline-average surface roughness is 0.1 μm or less.

7. A method as claimed in claim 1, wherein the polymer comprises a functional polymer, the number of functional groups being one per molecular weight of 300 to 10,000.

8. A method as claimed in claim 1, wherein the polymer has a weight-average molecular weight of 1,000 to 300,000.

9. A method as claimed in claim 1, wherein the polymer has a weight-average molecular weight of 1,000 to 300,000.

10. A method as claimed in claim 1, wherein the weight ratio of the hydrophilic monomer to the polymer is 5–400:100.

* * * * *